(12) United States Patent
Zimmer et al.

(10) Patent No.: US 7,673,128 B2
(45) Date of Patent: Mar. 2, 2010

(54) METHODS AND APPARATUS TO FACILITATE FAST RESTARTS IN PROCESSOR SYSTEMS

(75) Inventors: Vincent J. Zimmer, Federal Way, WA (US); Michael A. Rothman, Puyallup, WA (US); Mallik Bulusu, Olympia, WA (US); Greg McGrath, Olympia, WA (US); Michael Kinney, Olympia, WA (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1263 days.

(21) Appl. No.: 11/112,096

(22) Filed: Apr. 22, 2005

(65) Prior Publication Data

US 2006/0242399 A1 Oct. 26, 2006

(51) Int. Cl.
*G06F 15/177* (2006.01)
*G06F 9/24* (2006.01)
*G06F 1/24* (2006.01)
*G06F 11/00* (2006.01)

(52) U.S. Cl. .............................. 713/2; 713/1; 713/100; 714/23; 714/36

(58) Field of Classification Search ................ 713/2, 713/1, 100; 714/36, 23
See application file for complete search history.

(56) References Cited

U.S. PATENT DOCUMENTS 5,850,562 A * 12/1998 Crump et al. .................. 713/1
5,933,630 A * 8/1999 Ballard et al. ................. 713/1
5,974,546 A * 10/1999 Anderson ...................... 713/2
6,728,875 B1 * 4/2004 Aguilar et al. ................. 713/2
6,754,817 B2 * 6/2004 Khatri et al. .................. 713/1
7,315,962 B2 * 1/2008 Neuman et al. .............. 714/36
7,376,949 B2 * 5/2008 Lowell et al. ................. 718/1
7,418,584 B1 * 8/2008 Klaiber et al. ............. 712/229
2004/0268113 A1 12/2004 Rothman et al.
2005/0081212 A1 4/2005 Goud et al.

OTHER PUBLICATIONS

U.S. Appl. No. 10/827,763, filed Apr. 19, 2004, Zimmer et al.
U.S. Appl. No. 10/952,639, filed Sep. 29, 2004, Zimmer et al.
U.S. Appl. No. 11/009,891, filed Dec. 10, 2004, Goud et al.
U.S. Appl. No. 11/008,911, filed Dec. 10, 2004, Anderson et al.
Intel Corporation, *Enhanced Virtualization on Intel® Architecture-based Servers: Improve Utilization, Manage Change, Reduce Costs*, pp. 1-9, Mar. 2005.

* cited by examiner

*Primary Examiner*—Thomas Lee
*Assistant Examiner*—Stefan Stoynov
(74) *Attorney, Agent, or Firm*—Hanley, Flight & Zimmerman, LLC.

(57) ABSTRACT

Methods and apparatus to facilitate fast restarts in processor systems are disclosed. An example processor restart method disclosed herein includes recording a log of pre-boot initialization actions, and replaying a portion of the log during subsequent processor restarts to shorten pre-boot initialization time. The example processor restart method disclosed herein may further include creating a log index table for easier referral to portions of the log, storing the log and the log index table in non-volatile memory, using the log index table to reorder the replaying of the log, and reordering the replay of the log to initialize the video graphics adapter earlier in a processor restart sequence.

15 Claims, 6 Drawing Sheets

METHODS AND APPARATUS TO FACILITATE FAST RESTARTS IN PROCESSOR SYSTEMS

FIELD OF THE DISCLOSURE

This disclosure relates generally to processor systems, and, more particularly, to methods and apparatus to facilitate fast restarts in processor systems.

BACKGROUND

In recent years, computer and server platforms have grown increasingly complex. Larger platforms often include multiple-root bridge servers and a sophisticated platform fabric. Such platforms include a large number of devices (e.g., chips, buses, peripheral component interconnect (PCI) devices, memory controller hubs (MCH), input/output (I/O) controller hubs (ICH), expansion cards, and processors) and therefore pre-boot initialization of such platforms can be lengthy. For example, pre-boot initialization can now easily consume several tens of seconds at platform startup.

Pre-boot initialization involves the discovery, identification, sorting, address assignment, configuration space programming, running of option read only memories (ROMs), firmware/basic input/output system (BIOS) configuration, etc. of platform devices. Typically, during this pre-boot initialization time the platform has insufficient system state information to execute a video option ROM and display a splash screen, thereby leaving a system display device dark or blank. This darkness, which may last for several tens of seconds, may give a user an impression of a broken platform. Further, lengthy pre-boot initialization makes an achievement of 5-nines up-time of server platforms more difficult because more time is spent out-of-service.

DETAILED DESCRIPTION

Figure 1:
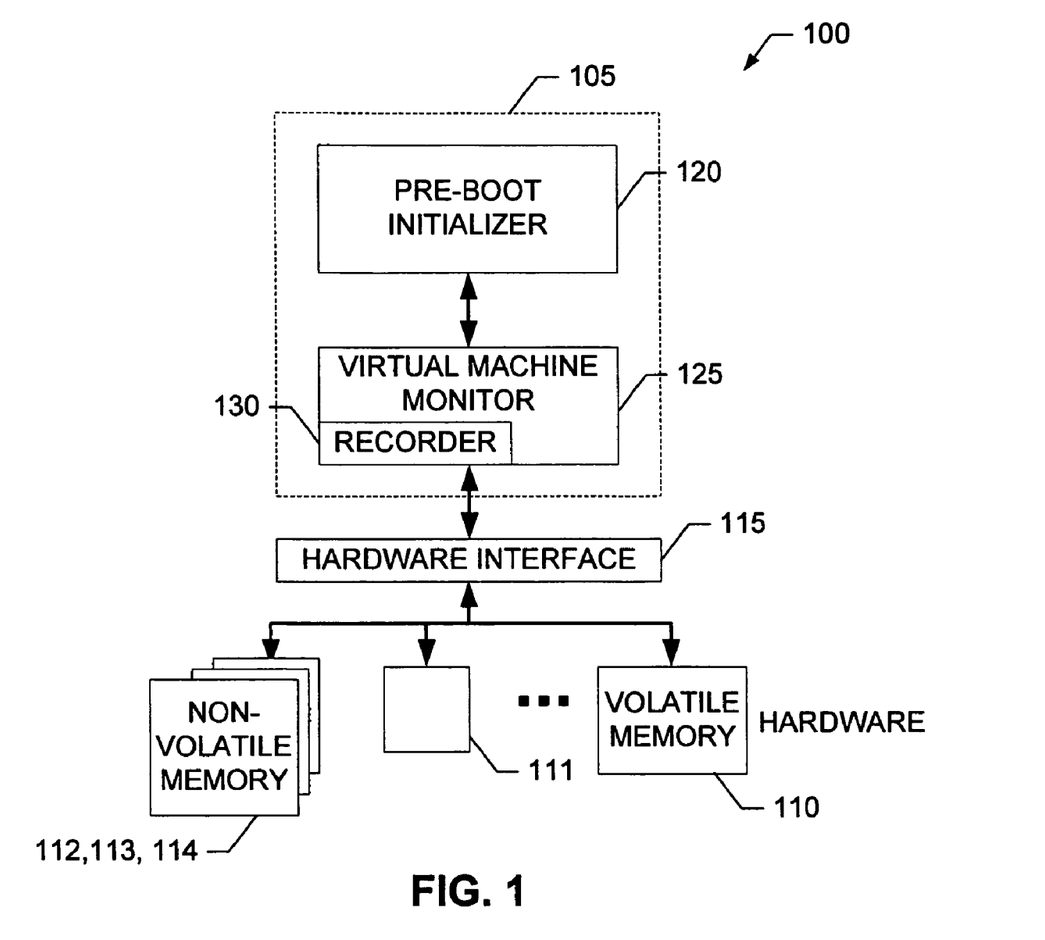
FIG. 1 is a block diagram illustrating an example disclosed processor restart system.

FIG. 1 is a schematic diagram illustrating an example disclosed processor restart system 100. In the example of FIG. 1, a processor 105 interacts with a plurality of hardware devices 110-114 via a hardware interface 115. The hardware devices 110-114 may include volatile memory 110, non-volatile memory 112,113,114, video graphic adapters, network interfaces, input/output devices, etc. For example, the processor 105, hardware interface 115, and the hardware devices 110-114 may be integrated into a single computer or server platform. The processor 105 may be a general purpose microprocessor, or a dedicated device that is able, among other things, to realize pre-boot initialization actions (e.g., the discovery, identification, sorting, address assignment, configuration space programming, running of option ROMs, firmware/BIOS configuration, etc. of each computer or server platform device) for a computer or server platform. Thus, the processor 105 includes a pre-boot initializer 120 to implement, among other things discussed below, these pre-boot initialization actions. Example implementations of these pre-boot initialization actions are well known to persons of ordinary skill in the art and, thus, are not further discussed.

Large portions of pre-boot initialization entail repeatable sequences that do not change across restarts (unless a system reconfiguration, e.g., hardware configuration change of the platform has occurred or the user has reconfigured system parameters). Accordingly, in the illustrated example, the processor 105 is provided with a virtual machine monitor (VMM) 125 and a recorder 130 that, as described in detail below, detect and record a log of the actions of the pre-boot initializer 120. In particular, the VMM 125 and the recorder 130 monitor interactions between the pre-boot initializer 120 and the hardware devices 110-114.

To shorten processor restart when system reconfiguration has not occurred, the pre-boot initializer 120 further implements: skipping pre-boot initialization actions (e.g., the discovery, identification, address sorting, etc.) that are not necessary to repeat because a system reconfiguration (e.g., hardware configuration change or system parameter reconfiguration) has not occurred; and implementing the remaining pre-boot initialization actions (e.g., address space assignment, configuration space programming, running of option ROMs, firmware/BIOS configuration, etc.) by replaying a portion of the actions as recorded in the log.

To initialize and configure a video adapter earlier in the pre-boot initialization, the pre-boot initializer 120 (while replaying the log during processor restart) replays the recorded pre-boot initialization actions out of sequence. In this way, the length of time during which a computer or server platform appears dark or inactive is substantially reduced. This reduction also allows the user to view pre-boot initialization activities as they are occurring, thereby facilitating easier viewing of any error messages and debugging of any failing pre-boot initialization activities. In the illustrated example, the re-ordered initialization sequence is: chipset initialization (MCH, ICH), video initialization (PCI video), and other PCI initialization (PCI cards 1, 2, 3, etc.).

To ensure that the log is retained from one processor restart to the next, the log in the illustrated example is stored in non-volatile memory 112,113,114. However, because the non-volatile memory 112,113,114 may not be initialized or available for writing to by the recorder 130 when the recorder 130 starts to record the log, in the illustrated example the recorder 130 records the log to a volatile memory 110 (which is available substantially immediately after processor restart begins). Subsequently, the processor 105 transfers the log from the volatile memory 110 to the non-volatile memory 112,113,114 before the hand-off from pre-boot initialization to operating system boot occurs. Alternatively, if non-volatile memory 112,113,114 is available for writing to by the recorder 130 when the recorder 130 starts to record the log, the recorder 130 may write directly to non-volatile memory 112,113,114.

Chipsets and I/O devices in computer and server platforms must have a unique PCI address number assigned to them during pre-boot initialization actions. Further, PCI devices are programmed through a configuration space, which uses a well-known standardized structure. As such, I/O traps on ports 0xCF8 and 0xCFC (PCI configuration address and PCI configuration data/response) can be used as an indication that the configuration space of a PCI device is being accessed.

Different offsets in the configuration space mean different things. For example, configuration space entries below 0x40 are standardized. Base address registers (BARs), e.g., 0x10, 0x14, 0x18, and 0x1C will be found in this address range. These registers are standard and dictate "where" in the address space a PCI card resides. Firmware/BIOS is responsible for programming these values. In discovery mode, the pre-boot initializer 120 does a resource management read/write access and sorting process to efficiently pack these locations in the address space. Example realizations of these discovery mode operations are well known to persons of ordinary skill in the art and, in the interest of brevity, are not further discussed. During replay in the illustrated example the pre-boot initializer 120 only needs to write to these BARs the parameters stored in the log and to register 0x5 in the configuration space to enable the device. Further, because the firmware/BIOS knows that these cards are plug-in, it can defer programming these until initialization of chipsets (e.g., MCH, ICH, etc.) is completed.

Memory Controller Hubs (MCH), Input/output Controller Hubs (ICH), and other chipsets (e.g., video graphic adapters) also must have fixed PCI configuration addresses. However, typically the configuration registers for these devices are located above 0x40 because the programming of these chipsets is not standardized. Initialization of a legacy video graphic adapter (VGA) chip entails two steps: (a) programming the PCI device to enable the chip; and (b) programming legacy VGA registers at addresses 0x3B0-0x3BF to set the mode. I/O traps on these addresses ranges can be used to know when pre-boot initializations actions are occurring for the video graphics adapter.

The VMM 125 is a thin software layer that facilitates the creation of virtual partitions in a computer or server platform. One or more guest operating systems and application stacks can be loaded on top of the VMM 125. Among other things, the VMM 125 emulates a complete hardware environment—a virtual machine—for each software stack. Ideally, the operating system and applications are completely unaware they are sharing hardware resources with other applications. Virtual machine monitors are well known to persons of ordinary skill in the art and, thus, are not further discussed.

To select pre-boot initialization actions to record in the log, in the illustrated example the VMM 125 is configured to trap pre-boot initialization actions that do not change from processor restart to processor restart (assuming a system reconfiguration has not occurred). Actions of interest include the I/O write actions of the option ROM and firmware/BIOS to configure a computer or server platform. The traps can be configured to trap write activity to the addresses corresponding to the configuration of the PCI devices making up the computer or server platform. In the illustrated example, the VMM 125 is configured to have a virtualization exit even upon guest firmware issuing I/O and memory-mapped I/O operations. Example implementations of VMMs and/or traps of processor activities in VMMs are well known to persons of ordinary skill in the art and, in the interest of brevity, are not further discussed.

Figure 3:
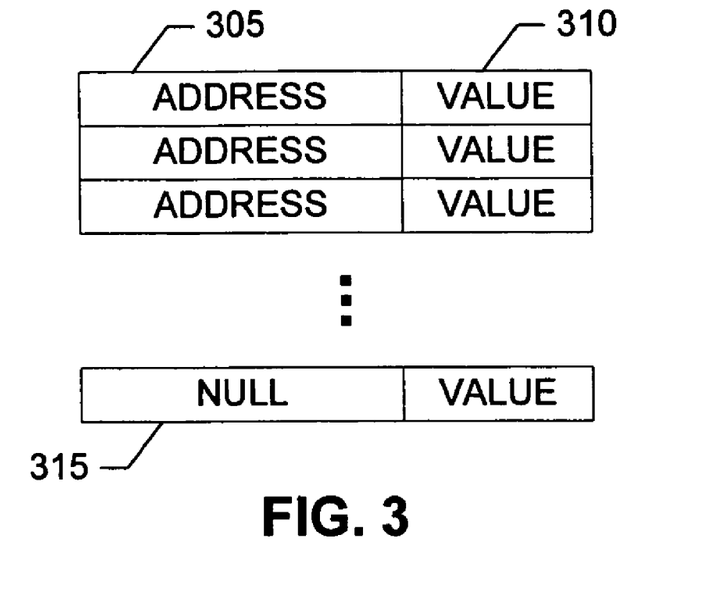
FIG. 3 is an example structure of a log utilized by the example system FIG. 1.

To record the pre-boot initialization actions of interest in the log, the VMM 125 of the illustrated example provides to the recorder 130 information regarding each pre-boot initialization action of interest. For each action of interest, the VMM 125 provides the recorder 130 with the address of the location that was written and the value that was written. The recorder 130 writes each action (as they occur) into the log (in volatile memory) in the order in which they are received from the VMM 125. FIG. 3 illustrates an example structure of the log utilized by the example system of FIG. 1. Each entry in the log contains a value 310 that was written to an address 305. The table is terminated with a NULL address 315.

In the illustrated example, the mechanism discussed above for generating the log using the VMM 125 and the recorder 130 may be deployed in a product development lab and the log is subsequently included in each product shipment in a pre-programmed non-volatile memory. During processor restart the process described above for replaying a portion of the log is implemented (assuming no system reconfiguration has occurred since manufacturing and product shipment). Alternatively, the mechanism as discussed above for generating the log using the VMM 125 and the recorder 130 is realized in each product shipment. In this alternative example, the processor 105 and the pre-boot initializer 120 include a determination that a log exists and that a system reconfiguration (e.g., hardware configuration change or system parameter reconfiguration) has not occurred since the log was created. If all these conditions are met, the pre-boot initializer 120 replays a portion of the pre-boot initialization actions from the log. If one or more of these conditions are not met, the VMM 125 and the recorder 130 are used to create a log of the pre-boot initialization actions for the current processor restart. If no subsequent system reconfigurations occur, the newly created log is used in subsequent processor restarts using the process described above.

Figure 2:
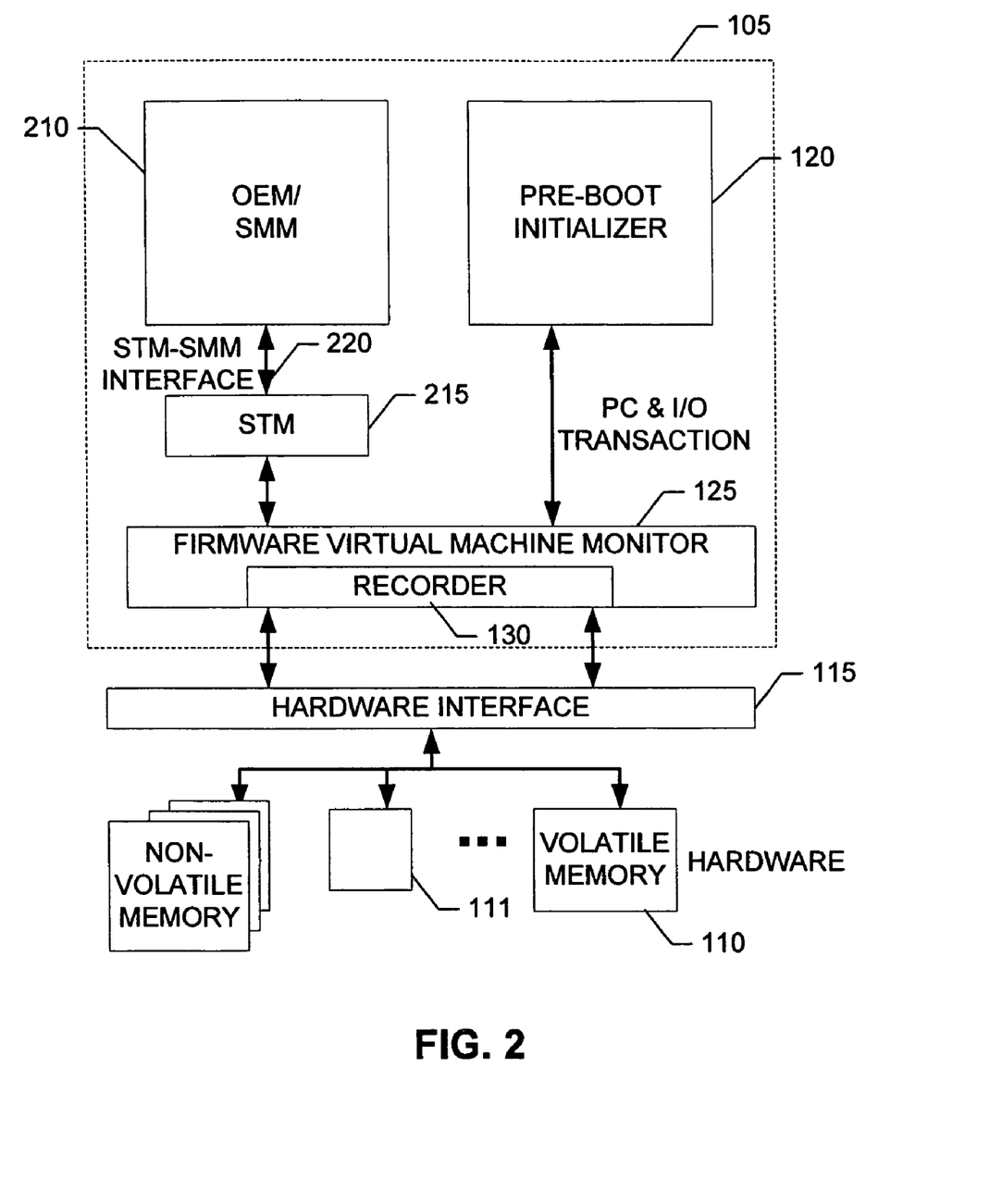
FIG. 2 shows the example processor restart system of FIG. 1 operating in conjunction with original equipment manufacturer (OEM) based systems management mode (SMM) firmware.

FIG. 2 shows the example processor restart system of FIG. 1 operating in conjunction with original equipment manufacturer (OEM) provided systems management mode (SMM) firmware 210. In the prior art, the OEM/SMM firmware 210 interacts with the hardware interface 115 via a special transfer mode (STM) 215 block via a STM-SMM interface 220 using, among other things, systems management interrupts (SMI). Example implementations of the OEM/SMM firmware 215, the STM 215, and the STM-SMM interface 220 are well known to one of ordinary skill in the art, and, thus, will not be discussed further. To allow the pre-boot initialization actions of the OEM/SMM firmware 210 in the illustrated example of FIG. 2 to be replayed (thereby further shortening processor restart in example platforms also including OEM/SMM firmware 210) during processor restart, the VMM 125 is further configured to trap the I/O write transactions of the OEM/SMM firmware 210 and the recorder 130 records these transactions in the log.

Figure 4:
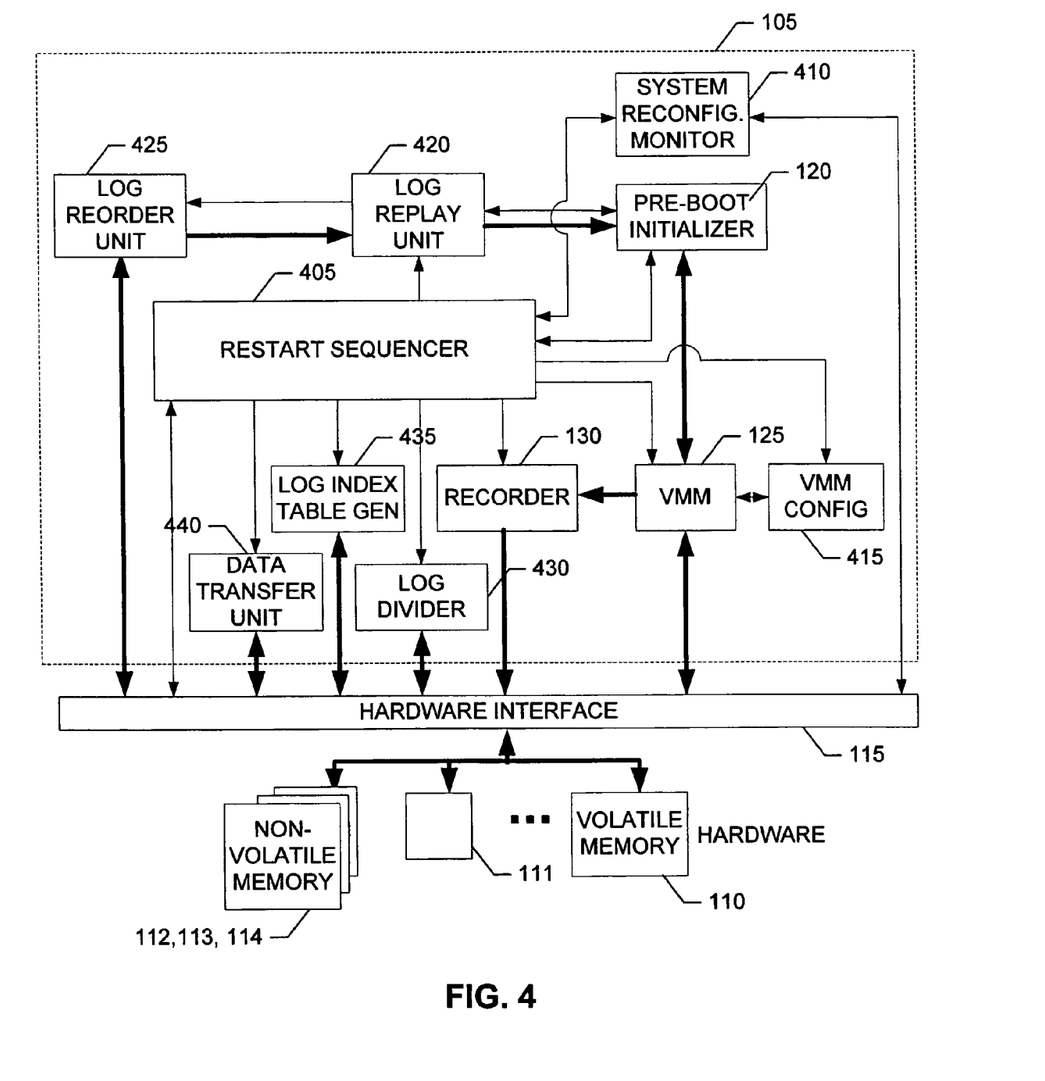
FIG. 4 is a block diagram illustration of an example manner of implementing the example processor of FIG. 1.

FIG. 4 illustrates an example manner of implementing the example processor restart system 100 of FIG. 1. For determination of whether or not a system reconfiguration has occurred, the illustrated processor 105 includes a system reconfiguration monitor 410. The system reconfiguration monitor 410 can use a variety of techniques well know to those of ordinary skill in the art to monitor hardware configuration changes and system parameter reconfigurations. For example, computer or server chassis intrusion detection, indicator bits in status registers when a system parameter reconfiguration has occurred, etc.

To provide sequencing and coordination of the various aspects of processor restart (including log creation, log replay, log reordering, etc), the illustrated processor 105 further includes a restart sequencer 405. The restart sequencer 405 may be implemented by a computer program executing on a processing element of the processor 105, or may be implemented by dedicated hardware that is able to coordinate a sequence of operations. At the beginning of processor restart in the illustrated manner, the restart sequencer 405 determines: (a) if a log exists in the non-volatile memory 112,113,114; and (b) if a system reconfiguration has occurred by polling the system reconfiguration monitor 410. If either a log does not exist or a system reconfiguration has occurred, the restart sequencer 405: (a) instructs the pre-boot initializer 120 that a new log is being created, (b) configures a VMM configuration memory 415, (c) initializes and starts the VMM 125, and (d) starts the recorder 130. If a log exists and if no system reconfiguration has occurred, the restart sequencer 405: (a) notifies the pre-boot initializer 120 of a shortened processor restart, (b) starts a log replay unit 420, and (c) starts a log reorder unit 425.

The VMM configuration memory 415 in the illustrated manner contains information that identifies for the VMM 125 all write I/O transactions that should be trapped and recorded in the log. For example, the configuration memory comprises a list of address ranges (where each list item includes starting address and length). The list is terminated by a NULL starting address. As is readily apparent to persons of ordinary skill in the art, the VMM configuration memory 415 may be implemented using standard processor memory or may be implemented using dedicated hardware registers.

If log recording is occurring, and upon notification from the pre-boot initializer 120 that pre-boot initialization actions are complete, the illustrated restart sequencer 405: (a) stops the VMM 125, (b) stops the recorder 130, (c) executes (i.e., starts and waits for completion) a log divider 430, (d) executes (i.e., starts and waits for completion) a log index table generator 435, and (e) executes (i.e., starts and waits for completion) a data transfer unit 440. To allow the replay of the log to occur during processor restart, the log must be stored in memory that is available to the processor 105 at substantially the start of pre-boot initialization. However, not all non-volatile memory is available immediately to the processor 105 for read/write access. Some types of non-volatile memory are available at substantially the start of pre-boot initialization, however, depending upon the size of the log these types of non-volatile memory may be cost prohibitive for storing the entire log. In the illustrated example, the log is divided and stored in any number (e.g., 1, 2, 3, etc.) of non-volatile memories. The portion(s) of the log required at substantially the start of pre-boot initialization is placed in non-volatile memory that is available at substantially the start of pre-boot initialization, the remaining portions are placed in non-volatile memory that becomes available (before they are needed for replay) as the pre-boot initialization actions proceed.

The log divider 430 of the illustrated manner divides the log into any number of portions (e.g., 1, 2, 3, etc.) based upon the size of the target non-volatile memories and based upon when in the pre-boot initialization sequence each non-volatile memory is available to the processor 105. To allow a video graphics adapter to be started earlier in the processor restart sequence, the log divider 430 places the portion of the log corresponding to initialization and configuration of the video graphics adapter in a portion of non-volatile memory that is available as early as is feasible given constraints on memory sizes and the necessity to initialize other devices in the platform first (e.g., MCH, ICH). In the illustrated example, the log is divided into two portions where the first portion is allocated to flash memory and the remaining portions are allocated to an IDE based hard-drive. The output of the log divider 430 of the illustrated example is placed in volatile memory. The log divider 430 may be implemented by a computer program executing on a processing element of the processor 105, or may be implemented by dedicated hardware that is able to operate on and rearrange blocks of memory.

Figure 5:
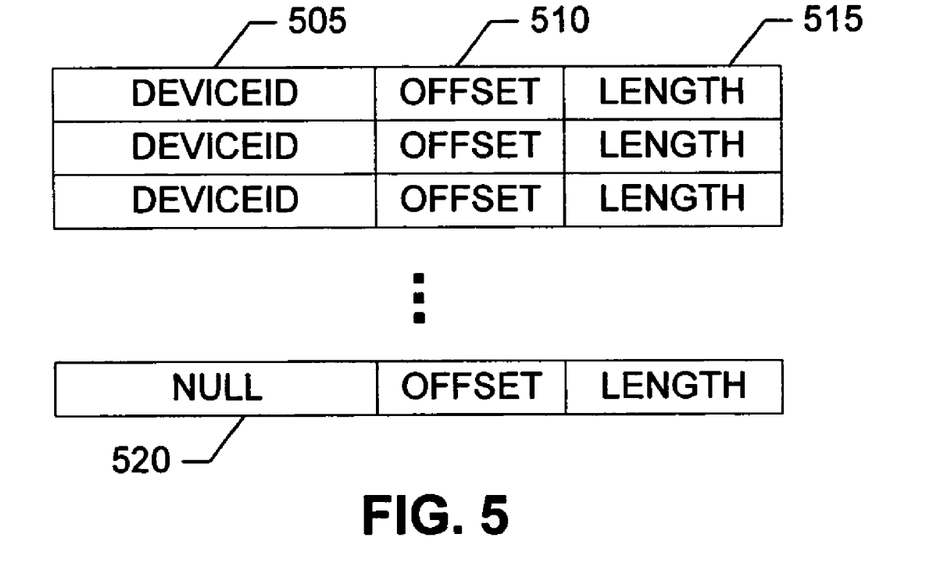
FIG. 5 is an example structure of a log index table utilized by the example system of FIG. 1.

To facilitate an efficient implementation of the log reorder unit 425, the processor 105 of the illustrated example includes the log index table generator 435. The log index table generator 435 processes the divided log to create a log index table in volatile memory useable to locate transactions in the divided log. FIG. 5 illustrates an example structure of the log index table. Each entry in the table identifies the device 505 that is being initialized and/or configured and values that represent an offset 510 into the divided log and the number 515 of log entries corresponding to that device. The log index table is terminated by a NULL device identifier 520. In the illustrated example the log is divided into more than one portion by the log divider 430, thus, the offset 510 in the log index table must completely identify the location (including which non-volatile memory device identification) of the logged actions. For example, the offset 510 is a structure containing a non-volatile memory device identifier and the location within the non-volatile memory. In the illustrated manner of FIG. 4, the log index table generator 435 proceeds sequentially through the divided log determining the set of actions corresponding to each device in the platform. Having identified a set of actions for a device, the log index table generator 435 creates a corresponding entry in the log index table. The log index table generator 435 may be implemented by a computer program executing on a processing element of the processor 105, or may be implemented by dedicated hardware that is able to operate on blocks of memory and store values in memory.

Data stored in volatile memory is lost when a processor restart occurs, and thus the processor 105 of FIG. 4 further includes the data transfer unit 440. The data transfer unit 440 transfers the divided log and the log index table from volatile memory to non-volatile memory. The non-volatile memory used to store each portion of the divided log and the log index table is as specified by the designer of the processor restart system 100. For example, in the illustrated example the first portion of the divided log and the log index table are allocated to flash memory and the second portion of the divided log is allocated to an IDE based hard-drive. The data transfer unit 440 may be implemented by a computer program executing on a processing element of the processor 105, or may be implemented by dedicated hardware that is able to operate on blocks of memory.

During processor restarts where pre-boot initializations are replayed from the log, the pre-boot initializer 120 receives from the log replay unit 420 a sequence of I/O write transactions to replay. In the illustrated manner of FIG. 4, the pre-boot initializer 120 polls the log replay unit 420 for the next action to replay. Alternatively, the log replay unit 420 notifies the pre-boot initializer 120 when the next action for replay is available.

So that a video graphics adapter is initialized and configured earlier in the processor restart sequence, the log replay unit 420 of the illustrated manner receives a copy of a reordered log from the log reorder unit 425. The log replay unit 420 provides the reordered log (as reordered by the log reorder unit 425) to the pre-boot initializer 120 for replay during processor restart. In the illustrated manner, the log reorder unit 425 uses the log index table (as previously generated by the log index table generator 435 and previously moved from volatile memory to non-volatile memory by the data transfer unit 440) to reorder the log. For example, the log reorder unit 425 can move through the log index table examining the device identifier to locate the next device to be initialized by the pre-boot initializer 120. Having found the log index table entry, the log reorder unit 425 reads the offset (consisting of a structure containing a non-volatile memory device identifier and the location within the non-volatile memory). Having located the start of the sequence of actions, the log reorder unit 425 reads the correct number (based on the length entry in the log index table) of log actions beginning from the starting location and passes them to the log replay unit 420. Finally, the log reorder unit 425 records that the device has been initialized. In the illustrated manner of FIG. 4, the log reorder unit 425 will determine the device initialization order such that the video graphics adapter is initialized and configured as early in the processor restart sequence as feasible. Persons of ordinary skill in the art will readily appreciate that the log reorder unit 425 could reorder the log so that one or more particular device(s) of interest (not limited to a video graphics adapter) could be started earlier or later in the processor restart sequence, or the log could be replayed without any reordering.

It should be readily apparent to a person of ordinary skill in the art, that the data transfer unit 440 may move the log index table and portions of the log from non-volatile memory 112-114 to volatile memory 110 before or during replaying of the log during processor restart. Thereby, replaying of the log during processor restart is completed using volatile memory 110 or a combination of volatile memory 110 and non-volatile memory 112-114 rather than non-volatile memory 112-114 (as discussed above).

Figure 6:
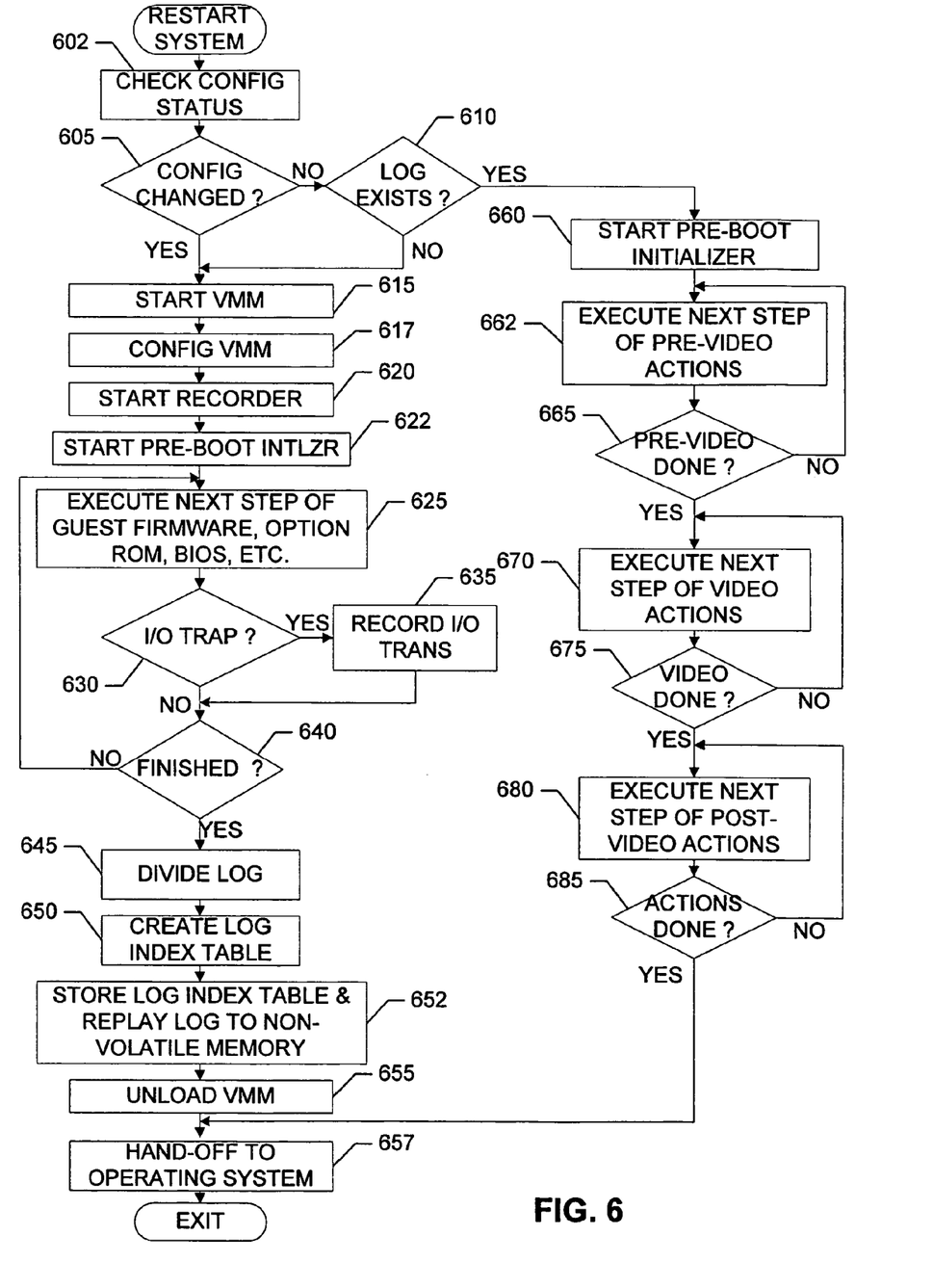
FIG. 6 is flow chart illustrating an example process that may be executed by the processor of FIG. 1.

A flowchart representative of an example process that may be executed by the example processor 105 of FIG. 4 is shown in FIG. 6. In this example, machine readable instructions comprise a program for execution by a processor such as one of the processors 705,706,707 shown in the example computer 700 discussed below in connection with FIG. 7. The program may be embodied in coded instructions stored on a tangible medium such as a compact disc read-only memory (CD-ROM), a floppy disk, a hard drive, a digital versatile disk (DVD), or a memory associated with the processors 705,706, 707, but persons of ordinary skill in the art will readily appreciate that the entire program and/or parts thereof could alternatively be executed by a device other than the processors 705,706,707 and/or embodied in firmware or dedicated hardware in a well known manner. For example, any or all of the pre-boot initializer 120, the VMM 125, the recorder 130, the restart sequencer 405, the log replay unit 420, the log reorder unit 425, the log divider 430, the log index table generator 435, and/or the data transfer unit 440 could be implemented by software, hardware, and/or firmware. Further, although the example program is described with reference to the flowchart illustrated in FIG. 6, persons of ordinary skill in the art will readily appreciate that many other methods of implementing the example processor 105 may alternatively be used. For example, the order of execution of the blocks may be changed, and/or some of the blocks described may be changed, eliminated, or combined.

The program of FIG. 6 begins at block 602 where the restart sequencer 405 polls the system reconfiguration monitor 410 to get system reconfiguration information. Based upon that information, the restart sequencer 405 determines if a system reconfiguration has occurred (block 605). If no system reconfiguration has occurred, control proceeds to block 610. Otherwise, control proceeds to block 615. Next, the restart sequencer 405 determines if a log exists (block 610). If a log exists, control proceeds to 660. Otherwise control proceeds to block 615.

If the restart sequencer 405 determined that a new log needs to be recorded, the restart sequencer 405 initializes and starts the trapping and recording process by: (a) starting the VMM 125 (block 615), (b) configuring the VMM configuration memory 415 (block 617), and (c) starting the recorder 130 (block 620). Next, the restart sequencer 405 starts the pre-boot initializer 120 performing a conventional processor restart sequence (block 622).

The pre-boot initializer 130 starts executing (one-by-one) each pre-boot initialization action (block 625). As each action is performed, the VMM 125 determines if a trap is to be performed (block 630). If a trap is to be performed, control proceeds to block 635 where the recorder 130 records the I/O write transaction into the log. At block 640, if all pre-boot initialization actions have been completed control proceeds to block 645. Else, control returns to block 625 to execute the next pre-boot initialization action.

Once the pre-boot initialization actions are completed, the restart sequencer 405 causes the following to be performed: (a) the log divider 430 divides the log (block 645), (b) the log index table generator 435 generates the log index table (block 650), and (c) the data transfer unit 440 transfers the divided log and the log index table from volatile memory 110 to non-volatile memory 112-114 (block 652). Next, the restart sequencer 405 unloads the VMM 125 (block 655). Finally, the restart sequencer 405 hands off control of the processor 105 to the operating system (block 657).

If a determination has been made by the restart sequencer 405 that an appropriate log is available (e.g., no system reconfiguration has occurred since log was created), the restart sequencer starts the pre-boot initializer 120 performing a processor restart sequence replay (block 660). The pre-boot initializer 120 replays each of the transactions that must be performed prior to initialization and configuration of the video graphics adapter from the re-ordered log (as determined by the output of the log reorder unit 425) and relayed by the log replay unit 420 (block 662). If there are no more transactions (decision block 665), control proceeds to block 670. Else, control returns to block 662. Next, the pre-boot initializer 120 replays each of the transactions for initialization and configuration of the video graphics adapter from the re-ordered log (as determined by the output of the log reorder unit 425) and relayed by the log replay unit 420 (block 670). If there are no more transactions (decision block 675), control proceeds to block 680. Else, control returns to block 670. Finally, the pre-boot initializer 120 replays each of the remaining transactions from the re-ordered log (as determined by the output of the log reorder unit 425) and relayed by the log replay unit 420 (block 680). If there are no more transactions (decision block 685), control proceeds to block 657. Else, control returns to block 680.

Figure 7:
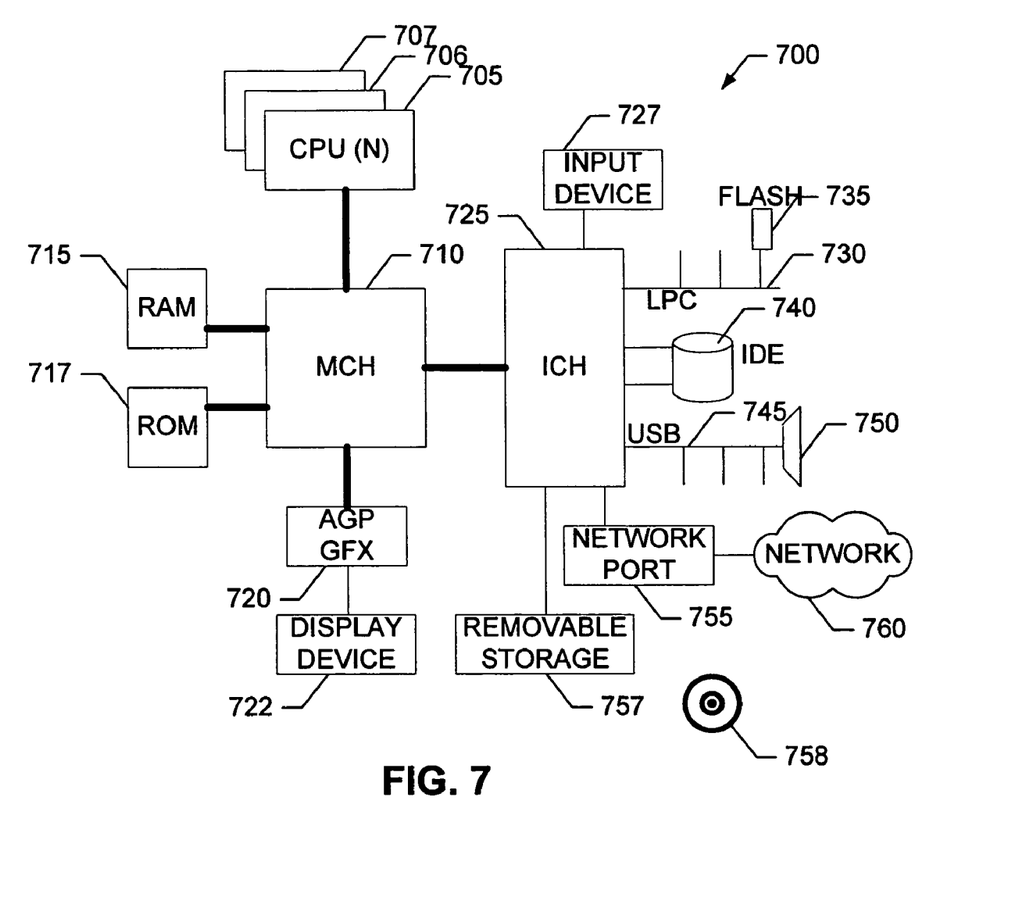
FIG. 7 is a schematic diagram of an example processor system that may execute the process of FIG. 6 to implement the example processor restart system of FIG. 1.

FIG. 7 illustrates an example processor system 700 capable of implementing the methods and apparatus disclosed herein. The processor system 700 includes processors 705,706,707 having associated system memory. The system memory may include one or more of a random access memory (RAM) 715, a ROM 717, and a flash memory 735.

The processors 705,706,707, in the example of FIG. 7, are coupled to an ICH 725 to which other peripherals or devices are interfaced. In the illustrated example, the peripherals interfaced to the ICH 725 include an input device 727, a low pin count (LPC) bus 730, the flash memory 735, a mass storage device 740 (e.g., hard disk drive), a universal serial bus (USB) 745, a USB device 750, a network port 755 which is further coupled to a network 760, and/or a removable storage device drive 757. The removable storage device drive 757 may include associated removable storage media 758, such as magnetic or optical media.

The example processor system 700 of FIG. 7 also includes a video graphics adapter card 720, which is a peripheral coupled to a MCH 710 and further coupled to a display device 722.

The example processor system 700 may be, for example, a conventional desktop personal computer, a notebook computer, a workstation, a network server, or any other computing device. The processors 705,706,707 may be any type of processing unit, such as a microprocessor from the Intel® Pentium® family of microprocessors, the Intel® Itanium® family of microprocessors, and/or the Intel XScale® family of processors.

The memories 715, 717, and 735, which form some or all of the system memory, may be any suitable memory devices and may be sized to fit the storage demands of the system 700. The ROM 717, the flash memory 735, and the mass storage device 740 are non-volatile memories. Additionally, the mass storage device 740 may be, for example, any magnetic or optical media that is readable by the processors 705,706,707.

The input device 727 may be implemented by a keyboard, a mouse, a touch screen, a track pad or any other device that enables a user to provide information to the processors 705, 706,707.

The display device 722 may be, for example, a liquid crystal display (LCD) monitor, a cathode ray tube (CRT) monitor, or any other suitable device that acts as an interface between the processors 705,706,707 and a user via the video graphics adapter 720. The video graphics adapter 720 is any device used to interface the display device 722 to the MCH 710. Such cards are presently commercially available from, for example, Creative Labs and other like vendors.

The removable storage device drive 757 may be, for example, an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 758 is complimentary to the removable storage device drive 757, inasmuch as the media 758 is selected to operate with the drive 757. For example, if the removable storage device drive 757 is an optical drive, the removable storage media 758 may be a CD-R disk, a CD-RW disk, a DVD disk or any other suitable optical disk. On the other hand, if the removable storage device drive 757 is a magnetic media device, the removable storage media 758 may be, for example, a diskette, or any other suitable magnetic storage media.

The example processor system 700 also includes the network port 755 (e.g., a processor peripheral), such as, for example, an Ethernet card or any other card that may be wired or wireless. The network port 755 provides network connectivity between the processors 705,706,707 and the network 760, which may be a local area network (LAN), a wide area network (WAN), the Internet, or any other suitable network.

Of course, one of ordinary skill in the art will recognize that the order, size, and proportions of the memory illustrated in the example systems may vary. For example, the user/hardware variable space may be sufficiently larger than the main firmware instructions space. Additionally, although the following discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above describes example systems, persons of ordinary skill in the art will readily appreciate that the examples are not the only way to implement such systems.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of performing a processor restart comprising:
    creating a log of pre-boot input/output write transactions in a processor pre-boot environment, wherein creating the log of pre-boot input/output write transactions comprises storing the log in a non-volatile memory; and
    replaying a portion of the log during subsequent restarts of the processor, wherein replaying the portion of the log during subsequent restarts comprises:
        determining if the log exists;
        determining if a system reconfiguration occurred;
        replaying the portion of the log if the log exists and no system reconfiguration has occurred;
        creating the log of pre-boot input/output write transactions if either the log does not exist or a system reconfiguration has occurred; and
    re-ordering the transactions, wherein re-ordering the transactions comprises initializing and starting a video adapter earlier in a restart sequence.

2. A method as defined in claim 1, wherein creating the log of pre-boot input/output write transactions comprises configuring a virtual machine monitor to trap input/output write transactions.

3. A method as defined in claim 2, wherein configuring the virtual machine monitor to trap the input/output write transactions comprises configuring trap parameters associated with option read only memory (ROM) and basic input/output system (BIOS) transactions.

4. A method as defined in claim 3, wherein configuring a virtual machine monitor to trap the input/output write transactions comprises configuring the trap parameters associated with systems management mode transactions.

5. A method as defined in claim 4, wherein re-ordering the transactions comprises initializing and starting a video adapter earlier in a restart sequence.

6. A method as defined in claim 1, wherein creating the log of pre-boot input/output write transactions comprises configuring a virtual machine monitor to trap the input/output write transactions.

7. A method as defined in claim 6, wherein configuring the virtual machine monitor to trap the input/output write transactions comprises configuring the trap parameters associated with option read only memory (ROM) and basic input/output system (BIOS) transactions.

8. A method as defined in claim 7, wherein configuring the virtual machine monitor to trap input/output write transactions comprises configuring the trap parameters associated with systems management mode transactions.

9. A method as defined in claim 1, wherein re-ordering the transactions further comprises:
    creating a log index table;
    storing the log index table in the non-volatile memory; and
    using the log index table to locate the transactions in the log.

10. A method as defined in claim 1, wherein storing the log in the non-volatile memory comprises dividing the log and storing the divided log in multiple non-volatile memories.

11. A method as defined in claim 1, wherein storing the log in the non-volatile memory comprises creating the log in a volatile memory and transferring the log from the volatile memory to the non-volatile memory.

12. A processor restart apparatus comprising:
a processor having a recorder to create a log of pre-boot input/output write transactions in a processor pre-boot environment;
a log replay unit to replay a portion of the log during subsequent restarts of the processor;
a non-volatile memory to store the log;
a restart sequencer to: determine if the log exists, determine if a system reconfiguration occurred, and start the log replay unit if the log exists and no system reconfiguration has occurred, wherein the restart sequencer starts the recorder if either the log does not exist or a system reconfiguration has occurred; and
a log reorder unit to reorder the transactions to initialize and start a video adapter earlier in a restart sequence.

13. A processor restart apparatus as defined in claim 12, wherein the processor comprises a virtual machine monitor to trap the input/output write transactions.

14. An article of manufacture storing machine readable instructions which when executed cause a machine to:
create a log of pre-boot input/output write transactions in a processor environment; and
replay a portion of the log during subsequent restarts of the processor;
store the log in a non-volatile memory;
check if the log exists;
check if a system reconfiguration occurred;
replay the portion of the log if the log exists and no system reconfiguration has occurred;
create the log of pre-boot input/output write transactions if either the log does not exist or a system reconfiguration has occurred;
replay the transactions in the log in a different order; and
replay the transactions to initialize and start a video adapter earlier in a restart sequence.

15. An article of manufacture as defined in claim 14, wherein the machine readable instructions cause the machine to create a virtual machine monitor to trap the input/output write transactions.

* * * * *